(12) United States Patent
Thonnart et al.

(10) Patent No.: US 9,430,600 B2
(45) Date of Patent: Aug. 30, 2016

(54) CELL LIBRARY AND METHOD FOR DESIGNING AN ASYNCHRONOUS INTEGRATED CIRCUIT

(71) Applicant: Commissariat a l'Energie Atomique et aux Energies Alternatives, Paris (FR)

(72) Inventors: Yvain Thonnart, Grenoble (FR); Pascal Vivet, Saint Paul de Varces (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/395,344

(22) PCT Filed: Apr. 22, 2013

(86) PCT No.: PCT/FR2013/050875
§ 371 (c)(1),
(2) Date: Oct. 17, 2014

(87) PCT Pub. No.: WO2013/164528
PCT Pub. Date: Nov. 7, 2013

(65) Prior Publication Data
US 2015/0121324 A1    Apr. 30, 2015

(30) Foreign Application Priority Data

May 4, 2012  (FR) .................................... 12 54127

(51) Int. Cl.
*G06F 17/50* (2006.01)
*G06F 1/10* (2006.01)
(Continued)

(52) U.S. Cl.
CPC ......... *G06F 17/505* (2013.01); *G06F 17/5059* (2013.01); *G06F 1/10* (2013.01);
(Continued)

(58) Field of Classification Search
CPC ........ G06F 1/12; G06F 11/25; G06F 13/385; G06F 13/4009; G06F 13/4213; G06F 13/423; G06F 17/5045; G06F 17/505; G06F 17/5059; G06F 1/06; G06F 1/10; G06F 2217/84
USPC .......................... 716/103, 104, 106, 132, 136
See application file for complete search history.

(56) References Cited

U.S. PATENT DOCUMENTS

| 6,130,475 A * | 10/2000 | Dell .......................... G06F 1/10 257/678 |
| 6,259,650 B1 * | 7/2001 | Wen .......................... G06F 5/12 365/189.04 |

(Continued)

OTHER PUBLICATIONS

Sokolovic et al.; "New concepts of worst-case delay evaluation in asynchronous VLSI SoC"; Year: 2008; Microelectronics, 2008. MIEL 2008. 26th International Conference on; pp. 377-385.*

(Continued)

*Primary Examiner* — Helen Rossoshek
(74) *Attorney, Agent, or Firm* — Moreno IP Law LLC (57) ABSTRACT

An asynchronous integrated circuit is designed from a library of cells comprising at least one cell having parameters of signal propagation between a first terminal and a second terminal and between the second terminal and a third terminal depending on the parameter of signal propagation between the first and the third terminal. A synchronous integrated circuit corresponding to the asynchronous integrated circuit is synthesized using said cell to represent a portion of the asynchronous circuit, said cell being rated by a dummy clock signal. The synthesized integrated circuit is verified using the parameter of signal propagation between the first terminal and the third terminal to simulate the operation of said portion of the asynchronous circuit.

11 Claims, 6 Drawing Sheets

(51) Int. Cl.
*G06F 11/25* (2006.01)
*G06F 13/40* (2006.01)
*G06F 1/12* (2006.01)

(52) U.S. Cl.
CPC ............. *G06F 1/12* (2013.01); *G06F 11/25* (2013.01); *G06F 13/4009* (2013.01); *G06F 17/5045* (2013.01); *G06F 2217/84* (2013.01)

(56) References Cited

U.S. PATENT DOCUMENTS

| | | | | |
|---|---|---|---|---|
| 6,476,643 B2* | 11/2002 | Hugues | ............ | G06F 9/3869 326/14 |
| 6,597,664 B1* | 7/2003 | Mithal | ............ | G06F 17/5045 370/252 |
| 6,701,491 B1* | 3/2004 | Yang | ............ | G01R 31/31715 716/106 |
| 6,901,055 B1* | 5/2005 | Hoe | ............ | G06F 17/5045 370/252 |
| 7,418,676 B2* | 8/2008 | Karaki | ............ | G06F 17/5059 716/103 |
| 7,647,567 B1* | 1/2010 | Esposito | ............ | G06F 17/504 716/132 |
| 8,065,647 B2* | 11/2011 | Stevens | ............ | G06F 17/5059 716/100 |
| 8,161,435 B2* | 4/2012 | Manohar | ............ | G06F 17/5059 326/101 |
| 8,301,933 B2* | 10/2012 | Manohar | ............ | G06F 1/06 713/400 |
| 8,443,315 B2* | 5/2013 | Manohar | ............ | G06F 17/5059 703/16 |
| 8,453,079 B2* | 5/2013 | Manohar | ............ | G06F 17/5045 716/103 |
| 8,661,378 B2* | 2/2014 | Manohar | ............ | G06F 17/5031 716/103 |
| 2007/0271538 A1* | 11/2007 | Douady | ............ | G01R 31/31726 716/104 |
| 2009/0288058 A1* | 11/2009 | Shiring | ............ | G06F 17/5059 716/104 |
| 2009/0288059 A1* | 11/2009 | Dimou | ............ | G06F 17/5059 716/104 |
| 2010/0083207 A1* | 4/2010 | Kobayashi | ............ | G06F 17/5045 716/124 |

OTHER PUBLICATIONS

Gibiluka et al.; "A Bundled-Data Asynchronous Circuit Synthesis Flow Using a Commercial EDA Framework"; Year: 2015; Digital System Design (DSD), 2015 Euromicro Conference on; pp. 79-86.*
Gong et al.; "Verification of asynchronous circuits with bounded inertial gate delays"; Year: 1998; Test Symposium, 1998. ATS '98. Proceedings. Seventh Asian; pp. 399-401.*
Smith et al.; "High-level design for asynchronous logic"; Year: 2001; Design Automation Conference, 2001. Proceedings of the ASP-DAC 2001. Asia and South Pacific; pp. 431-436.*
Zheng et al.; "Research on the Key Technologies of Asynchronous Circuit Design Based on Petri Net"; Year: 2008; Intelligent Information Technology Application, 2008. IITA '08. Second International Symposium on; vol. 3; pp. 852-856.*
Written Opinion issued in PCT/FR2013/050875 on Nov. 4, 2014.

* cited by examiner

CELL LIBRARY AND METHOD FOR DESIGNING AN ASYNCHRONOUS INTEGRATED CIRCUIT

BACKGROUND

The present invention relates to a library of standard cells for the forming of an asynchronous circuit and to a method of designing a synchronous circuit using these cells.

DISCUSSION OF THE RELATED ART

An integrated circuit may be synchronous or asynchronous. A synchronous integrated circuit is an integrated circuit having its operation rated by a periodic signal distributed throughout the circuit: the clock signal. An asynchronous integrated circuit is an integrated circuit having its operation ensured by other means than the use of a clock signal. The control of an asynchronous integrated circuit is generally performed locally by a synchronization between functional blocks.

Many tools for assisting the design of synchronous integrated circuits are available for sale. Such tools assist the designer at all steps of the design of a synchronous integrated circuit all the way to the definition of the masks which will be used to manufacture the integrated circuit. Synchronous integrated circuit design assistance tools implement optimization algorithms which have been improved for many years and turn out being particularly efficient to decrease the surface area occupied by the circuit, to decrease the circuit power consumption, to increase the circuit operating speed, etc. Assistance tools generally use standard cell libraries. Each cell corresponds to an assembly of elementary components (for example, MOS transistors) performing a function (for example, an OR, AND, NOR, or NAND gate, an inverter, a memory cell, etc.). A library contains a set of parameters defining the circuit diagram and the topology, as well as the input and output terminals of each cell. Each cell is further defined by parameters such as a response time, an output power, etc. In the design of an integrated circuit, cells of the library are selected, arranged, and interconnected to provide the required circuit functions.

Synchronous integrated circuit design assistance tools cannot for the time being be directly used to optimize the design of asynchronous integrated circuits. Indeed, asynchronous integrated circuits have specific characteristics which are generally not or little present in synchronous circuits and which are not taken charge of by synchronous integrated circuit design assistance tools. It is then generally not possible to benefit from all the optimization capacities of such tools.

It would however be desirable not to have to develop new design assistance tools dedicated to asynchronous circuits and to be able to use, for the design of asynchronous integrated circuits, directly the design assistance tools already available for the design of synchronous integrated circuits.

SUMMARY

Thus, an object of the present invention is to provide a cell library, enabling to use synchronous integrated circuit design assistance tools for the design of asynchronous circuits.

Another object of the present invention is to provide an asynchronous integrated circuit design method using synchronous integrated circuit design assistance tools.

Thus, an embodiment of the present invention provides a computer-implemented method of designing an asynchronous integrated circuit from a library of cells comprising at least one cell having parameters of signal propagation between a first terminal and a second terminal and between the second terminal and a third terminal depending on the parameter of signal propagation between the first and the third terminal, the method comprising the steps of:

synthesizing a synchronous integrated circuit corresponding to the asynchronous integrated circuit by using said cell to represent a portion of the asynchronous circuit, said cell being rated by a dummy clock signal; and verifying the synthesized integrated circuit by using the parameter of signal propagation between the first terminal and the third terminal to simulate the operation of said portion of the asynchronous circuit.

According to an embodiment of the present invention, the library comprises, for said cell, an indication that the second terminal is intended to receive a dummy clock signal during the design of the asynchronous integrated circuit by a synchronous integrated circuit design assistance tool.

According to an embodiment of the present invention, the cell is representative of a portion of the asynchronous circuit, the second terminal being intended, in operation, to receive a signal for resetting the circuit portion.

According to an embodiment of the present invention, the cell is representative of a portion of the asynchronous circuit, where the second terminal does not correspond to a physical terminal of the portion intended, in operation, to deliver or to receive signals.

According to an embodiment of the present invention, the cell comprises a first parameter of signal propagation from the first terminal to the second terminal and a second parameter of signal propagation from the second terminal to the third terminal, the first and second parameters being obtained from a third parameter of signal propagation from the first terminal to the third terminal, the third parameter corresponding to an array of elements $D_{i,j}^{r(A \to Z)}$ where i is an integer varying from 1 to P and j is an integer varying from 1 to Q, the second parameter corresponding to an array of elements $\hat{D}_j^{r(R \to Z)}$ obtained according to the following relation:

$$\hat{D}_j^{r(R \to Z)} = D_{I,j}^{r(A \to Z)}$$

I being a natural number selected between 1 and P, and the first parameter corresponding to an array of elements $\hat{S}_i^{r(A \to R)}$ obtained according to the following relation:

$$\hat{S}_i^{r(A \to R)} = D_{i,J}^{r(A \to Z)} - \hat{D}_J^{r(A \to Z)}$$

J being a natural integer selected between 1 and Q.

According to an embodiment of the present invention, the cell further comprises a fourth terminal B, a fourth parameter of signal propagation from the fourth terminal to the third terminal corresponding to an array of elements $D_{i,j}^{r(B \to Z)}$, the library further comprising a fifth parameter of signal propagation from the fourth terminal to the second terminal, the fifth parameter corresponding to an array of elements $\hat{S}_i^{r(B \to R)}$ obtained according to the following relation:

$$\hat{S}_i^{r(B \to R)} = D_{i,J}^{r(B \to Z)} - \hat{D}_J^{r(R \to Z)} + \text{Margin}$$

where Margin is a real number greater than or equal to zero, which is constant independently from i or which depends on the time taken by the transition of the dummy clock signal on the second terminal.

According to an embodiment of the present invention, the first terminal is, in operation, a terminal of reception of a first signal alternating between two states, the third terminal being, in operation, a terminal of provision of a second signal alternating between two states and the third parameter corresponding to the time between a state switching of the first signal and a state switching of the second signal.

According to an embodiment of the present invention, the second terminal corresponds to the terminal of the portion of the asynchronous circuit intended, in operation, to receive a signal for resetting said portion of the asynchronous circuit, the method comprising a step of designing a clock tree to transmit the dummy clock signal to said portion of the asynchronous circuit, the clock tree being used in operation as a network for the distribution of the reset signal to said portion of the asynchronous circuit.

According to an embodiment of the present invention, the verification step is carried out with an asynchronous model to simulate the operation of said portion of the asynchronous circuit.

An embodiment of the present invention also provides computer-readable storage means storing a computer program comprising a set of instructions executable by a computer to implement the previously-defined method.

An embodiment of the present invention also provides computer-readable storage means storing a cell library to implement the previously-defined method.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings.

DETAILED DESCRIPTION

In the following description, a binary signal is a signal which alternates between two levels, a high level or "1" and a low level or "0". The high and low levels of different binary signals may be different. Further, in the following description, the inverse of a binary signal at "1" corresponds to the binary signal at "0" and the inverse of a binary signal at "0" corresponds to the binary signal at "1".

Asynchronous circuits are often broken down into functional blocks between which data (called tokens) communicate via communication channels.

Figure 1:
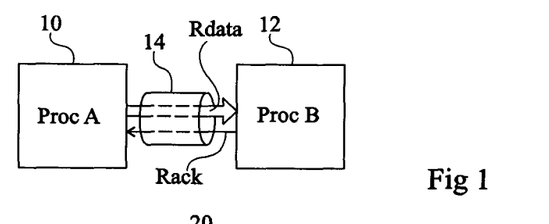
FIG. 1 schematically illustrates an example of an asynchronous circuit.

FIG. 1 shows a transmitter functional block 10 (Proc A) connected to a receiver functional block 12 (Proc B) by a communication channel 14. Communication channel 14 corresponds to the wires used for the transmission of signals, Rdata and Rack, between transmitter 10 and receiver 12 and to the communication protocol implemented to perform the signal transmission. The transmitted signals comprise the control signals dedicated to the communication between blocks 10, 12 and signals carrying the other data. The assembly of wires transporting data other than the control signals is called data bus.

In the following description, data exchanges between blocks 10 and 12 which are directional, from transmitter 10 to receiver 12, are considered. Transmitter 10 is active when it initializes the transfer by indicating that the datum on channel 14 is valid, which is detected by receiver 12 by means of the data coding used. For a passive transmitter 10, receiver 12 requests a new datum due to acknowledgement signal Rack. In the following description, communication channels having an active transmitter and a passive receiver are considered.

The functional blocks of an asynchronous circuit may be arranged in a succession of a plurality of stages, each stage being connected to a previous stage of the succession and to a next stage of the succession. Such a circuit is called "pipeline-type circuit" or "pipeline". Examples of pipelines will now be described.

Figure 2:
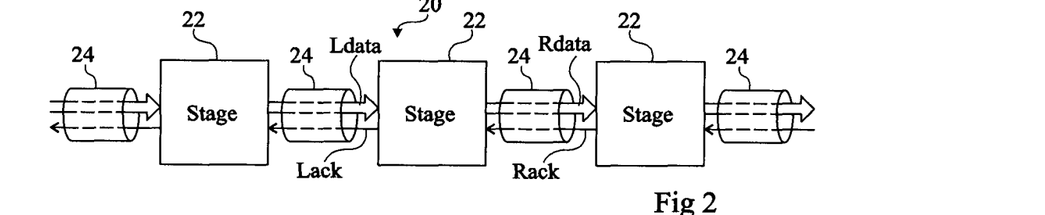
FIG. 2 schematically shows an example of an asynchronous pipeline-type circuit.

FIG. 2 schematically shows an example of a pipeline 20. Circuit 20 comprises a succession of functional blocks 22 (Stage). Each functional block 22 is connected to the next block by a communication channel 24. Each functional block 22 delivers multiple-bit data signal Rdata to the next functional block in the succession of functional blocks and receives one-bit acknowledgement signal Rack from the next functional block. Each functional block 22 delivers a one-bit acknowledgement signal Lack to the previous functional block in the succession of functional blocks and receives a multiple-bit data signal Ldata from the previous functional block. Thereby, signal Ldata of a given stage corresponds to signal Rdata of the previous stage, signal Lack of a given stage corresponds to signal Rack of the previous stage, signal Rdata of a given stage corresponds to signal Ldata of the next stage, and signal Rack of a given stage corresponds to signal Lack of the next stage. A plurality of identical or different functional blocks 22 may be used in parallel to form wider data channels formed of signals Rdata and Rack over a larger number of bits.

The flow rate of a pipeline is the number of tokens per second which passes through a given stage. The latency is the time necessary for a datum to cross the pipeline stages. The cycle time of a stage is the minimum time separating the taking into account of two successive data in the stage.

The pipeline may be a linear pipeline as shown in FIG. 2. In this case, each stage 22 has a single input channel (transmitting signals Lack and Ldata) and a single output channel (transmitting signals Rack and Rdata). The pipeline may be a non-linear pipeline. It then comprises at least one stage which may have at last two input channels connected to two different previous stages and/or at least two output channels connected to two different next stages.

An example of coding of the data exchanged between two stages comprises adding a wire to the data bus to specify that the data are valid. This type of coding is called "bundled data" coding. Another example of data coding comprises integrating the validity information in the data transported by the data bus. It is then spoken of a "delay-insensitive" coding. An example of a delay-insensitive coding is the 4-state coding. In this coding, each data bit is represented by two wires. Among the four possible state combinations for the two wires, half of them (for example, combinations 00 and 10) are reserved for bit value "0", the other half (for example, combinations 11 and 01) being reserved for bit value "1". The transmission of a new datum translates into the switching of the state of a single wire and the validity of the data is ensured by the parity change of the pair of wires. Another example of a delay-insensitive coding is the 3-state coding. In this coding, each data bit is also represented by two wires. A single wire state combination represents a bit value (for example, combination 01 for bit "1" and combination 10 for bit "0"), while the third combination (for example, combination 00) indicates the invalid state and the fourth combination (for example, combination 11) is not used. The 3-state coding is a special case of the "1-out-of-N" coding where the transmission of a base-N digit uses N wires. Each wire in the high state represents a base-N digit and the invalid state is obtained by the setting to zero of all wires. Combinations where two wires are simultaneously in the high state are forbidden. Similarly, there exists an "M-out-of-N" coding. The present invention may be implemented for the design of an asynchronous circuit implementing a "bundled data" coding or a "delay-insensitive" coding.

The communication protocol corresponds to all the rules governing the signal exchange within communication channel 14 between the two functional blocks 10 and 12. For an asynchronous circuit, an example of a communication protocol between functional blocks is the "handshake"-type protocol. The "handshake"-type protocol may be a 4-phase or 2-phase protocol.

Figure 3:
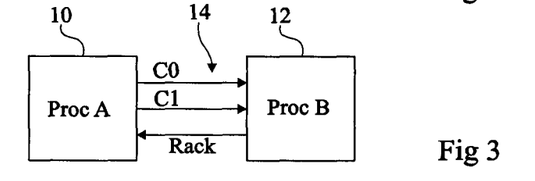
FIG. 3 schematically illustrates an example of an asynchronous circuit capable of implementing a "1-out-of-2" coding.

FIG. 3 shows an embodiment of a communication channel 14 capable of implementing a coding of "1-out-of-2" type. Communication channel 14 comprises three wires transporting data signals C0, C1 and acknowledgement signal Rack.

Figure 4:
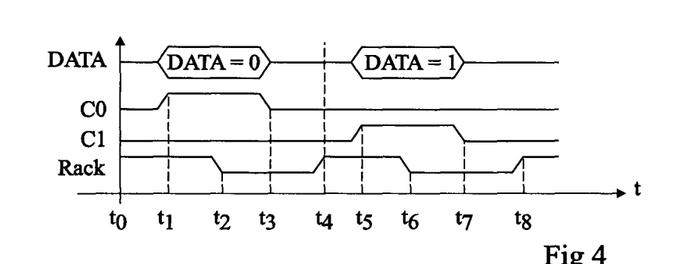
FIG. 4 is a timing diagram illustrating a "handshake"-type protocol of data exchange between the functional blocks of FIG. 3.

FIG. 4 illustrates the principle of a four-phase "handshake"-type protocol between functional blocks 10 and 12 of FIG. 3 for a "1-out-of-2" data coding. In the following description, unless otherwise indicated, the transferred datum corresponds to a bit at "0" when signal C0 is at "1" and signal C1 is at "0" and the transferred datum corresponds to a bit at "1" when signal C0 is at "0" and signal C1 is at "1". In the other cases, the data are not valid. In the following description, acknowledgement signal Rack is valid when it is at "0". Times $t_0$ to $t_8$ are successive times.

At time $t_0$, signals C0 and C1 are at "0" and acknowledgement signal Rack is at "1". There are no valid data to be transferred. At time $t_1$, signal C0 switches to "1". Receiver 12 detects the new datum (data bit equal to "0"), processes this datum, and enables acknowledgement signal Rack by setting it to "0" at time $t_2$. Transmitter 10 detects acknowledgement signal Rack and invalidates the data by setting signal C0 to "0" at time $t_3$. Receiver 12 detects the invalid state of the data and disables acknowledgement signal Rack by setting it to "1" at time $t_4$. Times $t_5$ to $t_8$ are associated with the transfer of another datum (data bit equal to "1").

Asynchronous circuits may be quasi-delay insensitive or QDI circuits. The definition of QDI circuits uses the concept of isochronous fork, that is, a fork which connects a single transmitter to two receivers and for which the propagation delays of a signal between the transmitter and the receivers are identical.

A QDI circuit is an asynchronous circuit for which:

the propagation delay of a signal in a wire or in a functional block may take any value; and for isochronous forks, the acknowledgement may be performed only for one of the fork branches.

The present invention is particularly well adapted to QDI asynchronous pipelines. Unless otherwise indicated, in the following description, the present invention is described for the design of QDI asynchronous pipelines.

There exist several types of pipelines having their structure depending on the communication protocol implemented for the data exchange between the pipeline stages. Examples of pipelines having their communication protocol between stages respecting the previously-described "handshake"-type protocol are the WCHB (Weak-Condition Half-Buffer) pipeline, the RSPCHB (Reduced-Stack Pre-Charge Half-Buffer) pipeline, the PCHB (Pre-Charge Half-Buffer) pipeline, and the PCFB (Pre-Charge Full-Buffer) pipeline.

Figure 5:
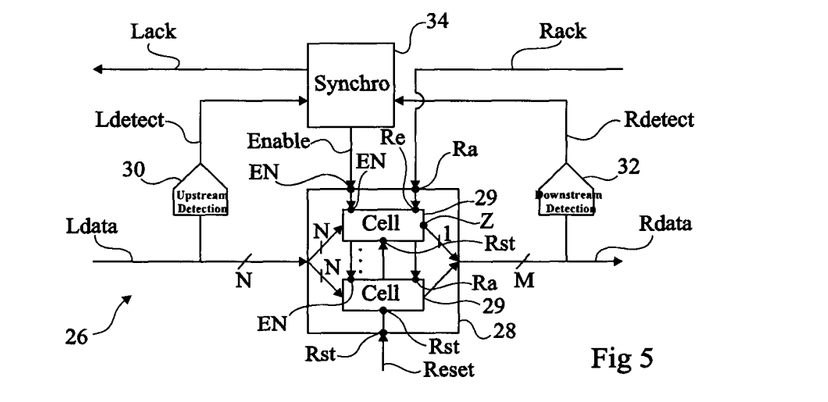
FIG. 5 schematically shows a general example of a stage of an asynchronous pipeline.

FIG. 5 schematically shows an embodiment of a stage 26 enabling to form a stage of a WCHB, RSPCHB, PCHB, or PCFB pipeline.

Stage 26 comprises a functional block 28 receiving signal Ldata (having N bits) and delivering signal Rdata (having M bits), N and M being integers which may be different. Functional block 28 is capable of carrying out operations on data Ldata which depend, in particular, on the pipeline type. Functional block 28 further receives, on a terminal Ra, acknowledgement signal Rack delivered by the next stage of the pipeline. Functional block 28 may further receive a reset signal Reset on a terminal Rst. Functional block 28 may further comprise a terminal EN for receiving an enable signal Enable.

Functional block 28 comprises M cells (Cell) 29. Cells 29 are generally identical. Each cell 29 receives N-bit signal Ldata, carries out an operation on data Ldata, and delivers, according to the result of the operation, a one-bit signal. The M 1-bit signals delivered by the M cells 29 form signal Rdata. Each cell 29 also receives acknowledgement signal Ra, enable signal Enable, and reset signal Reset. Each cell 29 comprises input terminals, an output terminal and, like functional block 28, a terminal Ra for receiving acknowledgement signal Rack and possibly a terminal EN for receiving signal Enable and/or a terminal Rst for receiving reset signal Reset.

Stage 26 may comprise an upstream detection block 30 which receives data Ldata and which delivers a one-bit signal Ldetect. Signal Ldetect is active if valid data Ldata are present at the input of functional block 28. Stage 26 comprises a downstream detection block 32 which receives data Rdata and which delivers a one-bit signal Rdetect. Signal Rdetect is active if functional block 28 delivers new valid data Rdata.

Stage 26 may comprise a synchronization block 34 which receives signals Ldetect and Rdetect and which delivers acknowledgement signal Lack to the previous stage of the pipeline. Synchronization block 34 may further deliver enable signal Enable to terminal EN of functional block 28.

Stage 26 may be formed by providing for acknowledgement signals Rack or Lack to be active in the low state or in the high state. Similarly, signals Ldetect and Rdetect may be active in the low level or in the high level. In the case where the active level of signals Ldetect and Rdetect is the low level, the outputs of detection blocks 30 and 32 are shown with an inverter.

Figure 6:
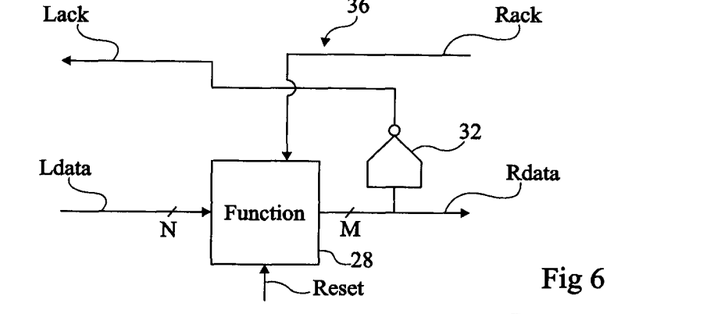
FIG. 6 schematically shows a stage of a WCHB pipeline.

FIG. 6 shows an embodiment of a stage 36 of a WCHB pipeline which corresponds to a specific example of stage 26 of FIG. 5 where upstream detection block 30 is not present. Further, signal Enable is not present. Synchronization block 34 corresponds to a wire receiving the output of downstream detection block 32 and delivering acknowledgement signal Lack. Reset signal Reset may be absent.

More specifically, the communication protocol of a stage of the WCHB pipeline comprises the successive steps of:
waiting for the input data to be valid and for the acknowledgement signal of the next stage to be disabled;
outputting new valid data;
enabling the acknowledgement signal delivered at the previous stage;
waiting for the input data to be invalid and for the acknowledgement signal of the next stage to be enabled;
invalidating the output data; and
disabling the acknowledgement signal delivered at the previous stage.

Figure 7:
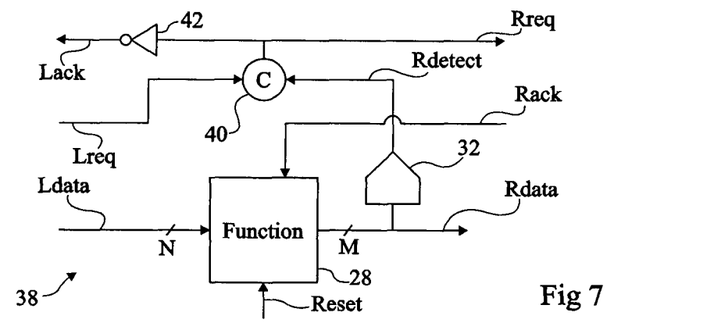
FIG. 7 schematically shows a stage of a RSPCHB pipeline.

FIG. 7 shows an embodiment of a stage 38 of a RSPCHB pipeline which corresponds to a specific example of stage 26 of FIG. 5 where upstream detection block 30 is not present. Further, signal Enable is not present. Synchronization block 34 comprises a C-element 40 and an inverter 42. C-element 40 comprises a first input receiving the output of downstream detection block 32 and a second input receiving a 1-bit request signal Lreq from the previous stage of the pipeline. C-element 40 delivers a 1-bit request signal Rreq to the next stage of the pipeline. Signal Rreq is also delivered to the input of inverter 42 which delivers acknowledgement signal Lack. Reset signal Reset may be absent.

A C-element (also called Muller C-gate or C-element) is a gate which outputs the value present at the gate inputs when these inputs are identical, and which, in the opposite case, maintains at its output the last delivered value. A C-element may comprise an additional input receiving a reset signal Reset which, when it is enabled, sets the output signal of the gate to "0" and has no influence on the output signal of the gate when it is not enabled. A C-element may have two inputs or more than two inputs.

An asymmetrical C-element is a variation of the previously-described C-element according to which first input signals switch the output up to "1" and second input signals, which are not always the same as the first input signals, switch the output down to "0". When the first input signals are all at "1", the output switches to "1". When the second input signals are all at "0", the output switches to "0". If none of these conditions is true, the output remains unchanged.

A symmetrical or asymmetrical C-element enables to achieve in an asynchronous circuit a rendez-vous function (also called synchronization function) between two signals or more than two signals. An element carrying out a rendez-vous function, or rendez-vous element, is an element which receives a plurality of input signals and delivers at least one output signal and modifies the output signal only when the input signals respect a special condition, and which does not modify the output signal when the input signals do not respect the special condition.

Figure 8:
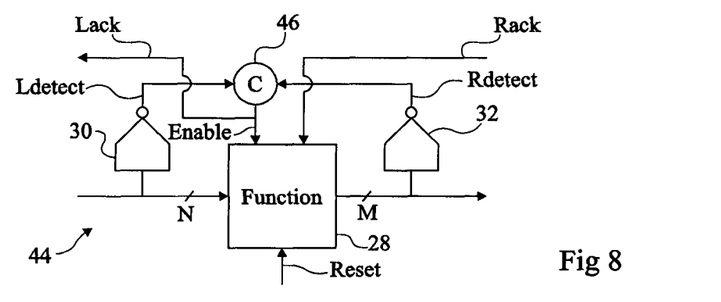
FIG. 8 schematically shows a stage of a PCHB pipeline.

FIG. 8 shows an embodiment of a stage 44 of a PCHB pipeline which corresponds to a specific example of stage 26 of FIG. 5 where synchronization block 34 comprises a C-element 46 which receives signals Ldetect and Rdetect delivered by detection blocks 30 and 32. C-element 46 delivers acknowledgement signal Lack. Signal Enable is equal to acknowledgement signal Lack. Reset signal Reset may be absent.

Unlike the WCHB pipeline, the validity test of the incoming data is explicitly carried out by block 30. The output is reset sooner to zero as soon as it is acknowledged without waiting for the invalidity of the input channel. Acknowledgement signal Lack is set back for the next datum once the input channel is reset.

More specifically, the communication protocol of a stage of the PCHB pipeline comprises the successive steps of:
waiting for the input data to be valid and for the acknowledgement signal of the next stage to be disabled;
outputting new valid data;
enabling the acknowledgement signal delivered at the previous stage;
waiting for the acknowledgement signal of the next stage to be enabled;
invalidating the output data;
waiting for the input data to be invalid;
disabling the acknowledgement signal delivered at the previous stage.

Figure 9:
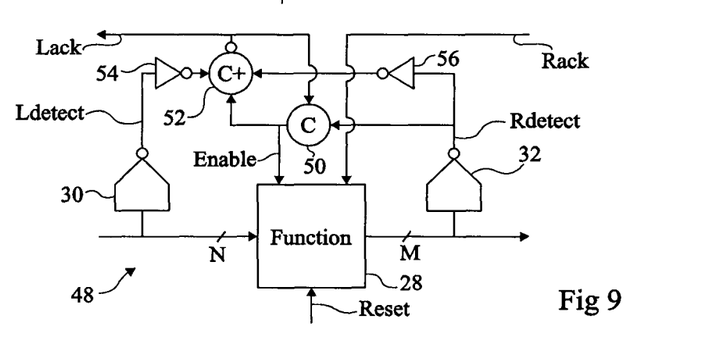
FIG. 9 schematically shows a stage of a PCFB pipeline.

FIG. 9 shows an embodiment of a stage 48 of a PCFB pipeline which corresponds to a specific example of stage 26 of FIG. 5 where synchronization block 34 comprises a symmetrical two-input C-element 50, an asymmetrical C-element 52, and two inverters 54 and 56. C-element 50 receives signal Rdetect and acknowledgement signal Lack and delivers signal Enable. Inverter 54 receives signal Ldetect and inverter 56 receives signal Rdetect. The first input signals of asymmetrical C-element 52 are the signal delivered by inverter 54, the signal delivered by inverter 56, and signal Enable. The second input signals of asymmetrical C-element 52 are the signal delivered by inverter 54 and signal Enable. The inverse of the signal delivered by asymmetrical C-element 52 corresponds to acknowledgement signal Lack.

The communication protocol of a stage of the PCFB pipeline comprises the successive steps of:
waiting for the input data to be valid and for the acknowledgement signal of the next stage to be disabled;
outputting new valid data;

enabling the acknowledgement signal delivered at the previous stage;

on the one hand, waiting for the acknowledgement signal of the next stage to be enabled and then invalidating the output data; and simultaneously on the other hand, waiting for the input data to be invalid and disabling the acknowledgement signal delivered to the previous stage.

Figure 10:
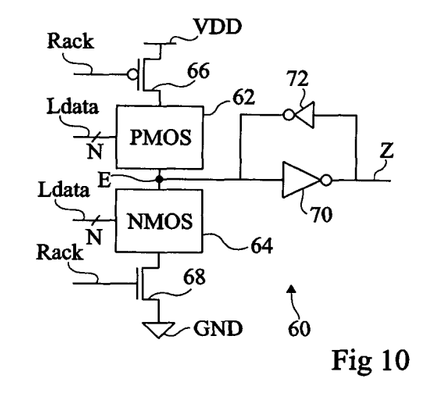
FIGS. 10 and 11 show embodiments of a functional cell of the WCHB stage of FIG. 6.

FIG. 10 shows an embodiment of a cell 60 of functional block 28 of stage 36 of the WCHB pipeline shown in FIG. 6. Cell 60 comprises a block 62 based on P-channel MOS transistors. Block 62 receives signal Ldata. Cell 60 comprises a block 64 based on N-channel MOS transistors. Block 64 receives signal Ldata. Blocks 62 and 64 are connected at a node E. Blocks 62, 64 carry out combinational logic functions on signal Ldata according to which the state of node E can be modified. Cell 60 comprises a P-channel MOS transistor 66 having its source connected to a source of a high reference voltage VDD, having its drain connected to block 62 and having its gate receiving acknowledgement signal Rack. Cell 60 comprises an N-channel MOS transistor 68 having its source connected to a source of a low reference voltage GND, having its drain connected to block 64, and having its gate receiving acknowledgement signal Rack. Acknowledgement signal Rack delivered by the next stage is used to authorize the operation of blocks 62, 64 via transistors 66 and 68. In this example, acknowledgement signal Rack, Lack is active at "0". Similar circuits may be designed with an acknowledgement signal Rack active at "1".

Cell 60 comprises an inverter 70 having its input connected to node E and having its output delivering a 1-bit signal Z. Cell 60 further comprises a weak inverter 72 having its input receiving signal Z and having its output connected to node E. Inverter 72 is called weak since its output may be forced when the potential at node E is imposed by voltage sources VDD and GND, via blocks 62, 64 and transistors 66, 68. As a variation, inverter 72 may be replaced with a block carrying out a combinational logic function and receiving signal Z and a multiple-bit signal C which depends on signal Ldata and having its output connected to node E. Cell 60 receives no reset signal Reset.

Figure 11:
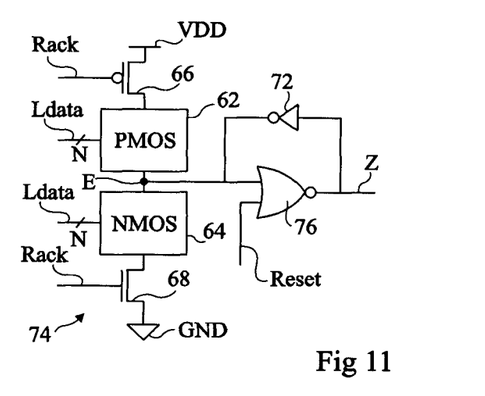

FIG. 11 shows an embodiment of a cell 74 of functional block 28 of stage 36 of the WCHB pipeline shown in FIG. 6 which, as compared with cell 60, comprises, instead of inverter 70, a NOR gate 76 having an input connected to node E, having its other input receiving reset signal Reset, and having its output delivering signal Z.

Figure 12:
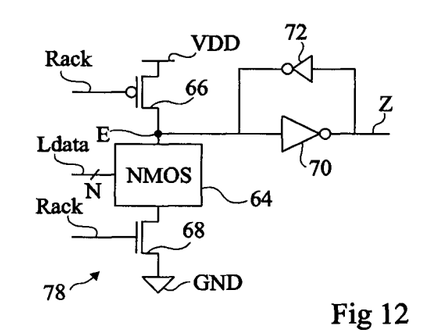
FIGS. 12 and 13 show embodiments of a functional cell of the RSPCHB stage of FIG. 7.

FIG. 12 shows an embodiment of a cell 78 of functional block 28 of RSPCHB pipeline stage 38 shown in FIG. 7 which, as compared with cell 60, does not comprise block 62. The drain of transistor 66 is directly connected to node E.

Figure 13:
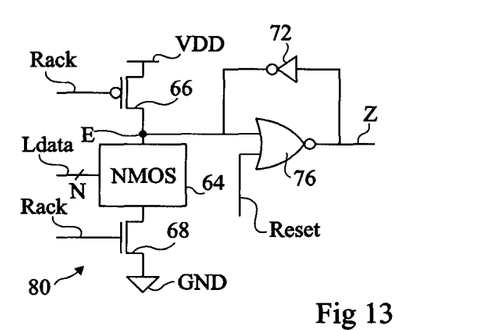

FIG. 13 shows another embodiment of a cell 80 of functional block 28 of RSPCHB pipeline stage 38 shown in FIG. 7, which, as compared with cell 78, comprises NOR gate 76 of cell 74 instead of inverter 70 of cell 78.

Figure 14:
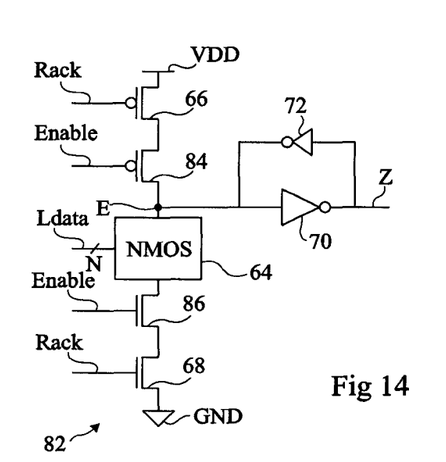
FIGS. 14 and 15 show embodiments of a functional cell of the PCHB stage of FIG. 8 or of the PCFB stage of FIG. 9.

FIG. 14 shows an embodiment of a cell 82 of functional block 28 of PCHB pipeline stage 44 shown in FIG. 8 or of PCFB pipeline stage 48 shown in FIG. 9, which, as compared with cell 78, further comprises a P-channel MOS transistor 84 having its source connected to the drain of transistor 66, having its drain connected to node E, and having its gate receiving signal Enable. Cell 82 further comprises an N-channel MOS transistor 86 having its source connected to the drain of transistor 68, having its drain connected to block 64, and having its gate receiving signal Enable.

Figure 15:
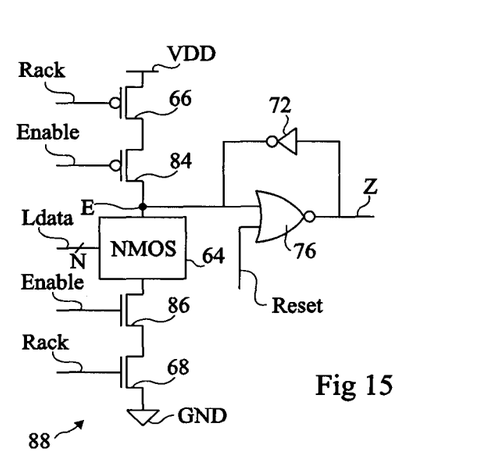

FIG. 15 shows another embodiment of a cell 88 of functional block 28 of PCHB pipeline stage 44 shown in FIG. 8 or of PCFB pipeline stage 48 shown in FIG. 9, which, as compared with cell 82, comprises NOR gate 76 of cell 80 instead of inverter 70 of cell 82.

Cells 60, 78, and 82 do not receive reset signal Reset while cells 74, 80, and 88 receive reset signal Reset. Signal Reset may be active in the high level or active in the low level. The resetting of internal node E by signal Reset in cells 74, 80, and 88 may be performed by different means, the use of NOR gate 76 being given as an example.

Figure 16:
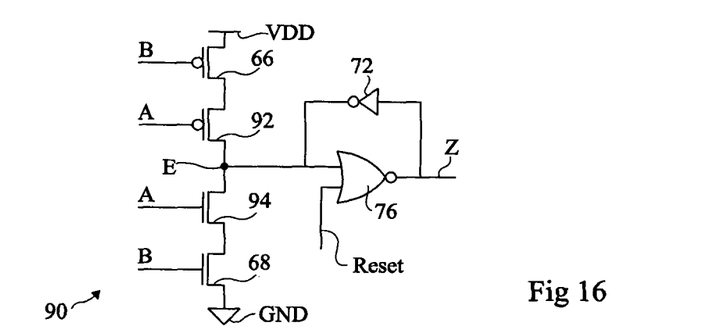
FIG. 16 shows an embodiment of a C-element.

FIG. 16 shows an embodiment of a two-input C-element 90 with reset which corresponds to a specific example of cell 74 shown in FIG. 11 where block 62 comprises a single P-channel MOS transistor 92 having its source connected to the drain of transistor 66 and having its drain connected to node E, and where block 64 comprises a single N-channel MOS transistor 94 having its source connected to the drain of transistor 68 and having its drain connected to node E. C-element 90 receives two binary signals A and B. Signal A is delivered to the gates of transistors 92 and 94 and signal B is delivered to the gates of transistors 66 and 68.

Figure 17:
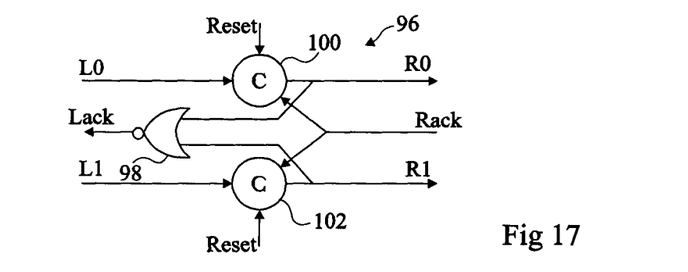
FIG. 17 shows a more detailed embodiment of the WCHB stage of FIG. 6.

FIG. 17 shows an embodiment of a stage 96 corresponding to a specific example of stage 36 of the WCHB pipeline of FIG. 6 in the case where functional block 28 only plays a data storage role and in the case of a "1-out-of-2" coding with signals Lack and Rack which are active in the low state. Stage 96 receives two one-bit input signals L0 and L1 and delivers two one-bit output signals R0 and R1. Downstream detection block 32 corresponds to a NOR gate 98 which receives output signals R0 and R1 and which delivers acknowledgement signal Lack to the previous stage. Functional block 28 comprises two cells, each corresponding to a C-element capable of being reset. More specifically, functional block 28 comprises a C-element 100 receiving signal L0 and acknowledgement signal Rack of the next stage and delivering output signal R0. Functional block 28 further comprises a C-element 102 receiving signal L1 and acknowledgement signal Rack of the next stage and delivering output signal R1.

As an example, C-element 100 may be formed as shown in FIG. 16. In this case, signals A and B of C-element 90 correspond to signals L0 and Rack, and signal Z of C-element 90 corresponds to signal R0.

Figure 18:
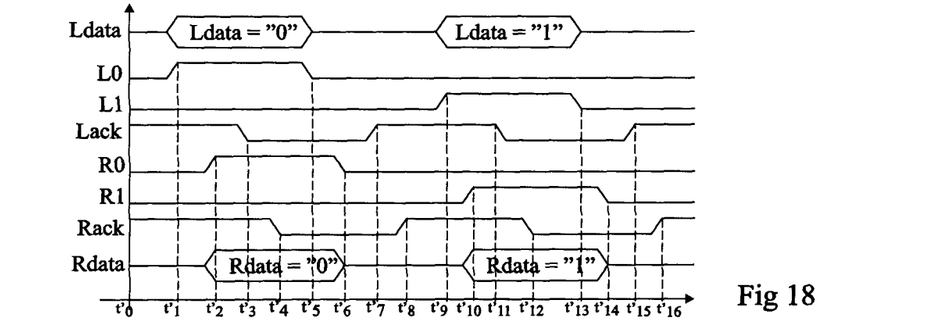
FIG. 18 is a timing diagram illustrating the data exchange protocol of the WCHB pipeline stage shown in FIG. 17.

FIG. 18 illustrates the principle of data transmission by stage 96. At time $t'_0$, signals L0 and L1 are at "0" and acknowledgement signals Lack and Rack are at "1". There are no validated data to be transferred. At time $t'_1$, signal L0 switches to "1" (reception of bit "0" by stage 96). At time $t'_2$, only when the two signals L0 and Rack are at "1", stage 96 sets signal R0 to "1". Times $t'_0$ to $t'_{16}$ are successive times. At time $t'_3$, stage 96 enables acknowledgement signal Lack by setting acknowledgement signal Lack to "0". At time $t'_4$, the stage following stage 96 in the pipeline sets signal Rack to "0". At time $t'_5$, the data are invalidated by the setting of signal L0 to "0". At time $t'_6$, only when the two signals L0 and Rack are at "0", signal R0 switches to "0". At time $t'_7$, stage 96 disables acknowledgement signal Lack by setting it to "1". At time $t'_8$, the stage following stage 96 in the pipeline disables acknowledgement signal Rack by setting it to "1". Times $t'_9$ to $t'_{16}$ are associated with the transfer of bit "1" by stage 96.

Figure 19:
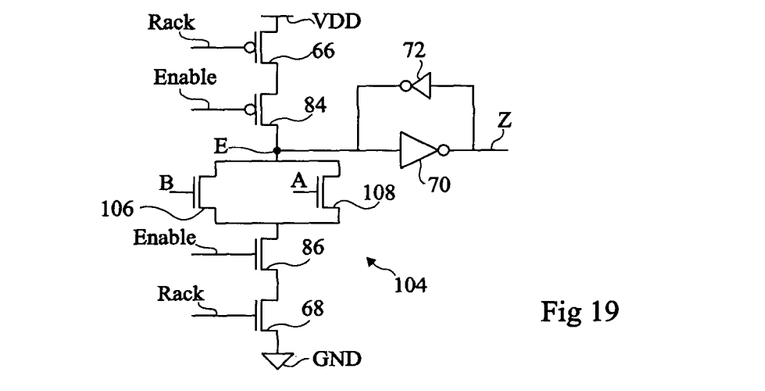
FIG. 19 shows a more detailed embodiment of the functional cell for a PCHB pipeline of FIG. 14.

FIG. 19 shows a specific embodiment 104 of PCHB pipeline cell 82 shown in FIG. 14 carrying out an OR logic function between two binary signals A and B and where block 64 comprises two N-channel MOS transistors 106 and 108 assembled in parallel, having their sources connected to the drain of transistor 86 and having their drains connected to node E. The gate of transistor 106 receives signal B and the gate of transistor 108 receives signal A.

Figure 20:
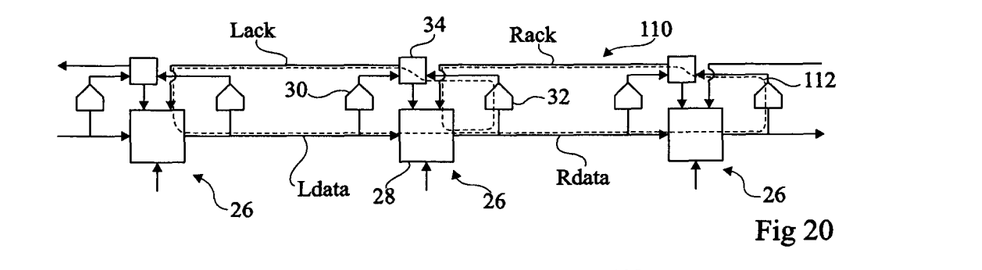
FIG. 20 schematically shows an example of the path traveled by a signal in an asynchronous pipeline.

FIG. 20 schematically shows an embodiment of a pipeline 110, for example, of WCHB, RSPCHB, PCHB, or PCFB type. Three successive stages 26 of pipeline 110 are shown.

Hereafter, a cell which carries out a rendez-vous or synchronization function between acknowledgement signal Rack and input signal Ldata (and possibly, besides, signal Enable for the PCHB or PCFB pipeline) is called rendez-vous element. The rendez-vous protocol elements may be cells 29 of functional block 28 or of cell assemblies 29 of functional block 28. For certain pipelines, the rendez-vous protocol element may further correspond to certain cells of synchronization block 34. As an example, for PCFB and RSPCHB pipeline stages 38, 48, the rendez-vous protocol elements may further correspond to elements 40, 50, and 52.

When the rendez-vous protocol element corresponds to a cell 29 of functional block 28 of stage 26, the rendez-vous protocol element may carry out a function additional to the rendez-vous function. For example, cell 104 shown in FIG. 19 for a PCHB pipeline carries out a logic function OR while carrying out the synchronization function between signals A, B, Rack, and Enable. The rendez-vous protocol element may further receive a reset signal. This is true, for example, for cells 74, 80, 88 shown in FIGS. 11, 13, and 15. The rendez-vous protocol element may receive no specific reset signal, as is the case for cells 60, 78, 82 shown in FIGS. 10, 12, and 14.

An optimization step conventionally implemented by synchronous integrated circuit design assistance tools comprises determining the propagation time of signals between functional blocks of the integrated circuit, particularly to determine whether there is an incompatibility with the frequency of the clock signal which rates the circuit operation. To achieve this, algorithms delimit paths traveled by a signal between two elements of the integrated circuit rated by the clock signal. These elements generally are storage elements, for example, flip-flops. In a synchronous integrated circuit, the distribution of the storage elements results in that the paths thus delimited between the storage elements comprise no or next to no loops, that is, there is no or next to no path for which a signal crosses the same location a plurality of times. It is then verified whether the travel time of a signal on each path is compatible with the rating of the storage elements by the clock signal. Algorithms may then optimize different parameters such as the position and the structure of the storage elements and of the combinational logic blocks between storage elements, to make sure that there is no incompatibility, to decrease the surface area occupied by the integrated circuit, to decrease the integrated circuit power consumption, to increase the operating speed of the integrated circuit, etc.

Path definition algorithms cannot be directly applied on design of asynchronous integrated circuits.

FIG. 20 illustrates a difficulty encountered when the synchronous integrated circuit design assistance tools are directly used for the design of asynchronous integrated circuits.

An asynchronous circuit comprises no storage elements having their operation rated by a clock signal. Thereby, following the path of a signal in an asynchronous circuit, said signal may propagate in loops, crosses the same location a plurality of times. An example of such a path 112 is shown in dotted lines in FIG. 20. In an asynchronous circuit, the path definition step thus cannot be carried out in the same way as for synchronous integrated circuits. The designer should then indicate the starting and end points of the paths to the design assistance tool. A possibility comprises indicating to the design assistance tools not to consider the path portions (also called internal paths or arcs hereafter) traveled by the signals in certain elements of the asynchronous integrated circuit, for example the rendez-vous protocol elements, in particular, the cells of functional block 28 of each stage 26, which enables to define paths, each path extending from the output of a rendez-vous protocol element to the input of another rendez-vous protocol element. The loops are thus interrupted. However, the design assistance tool then cannot perform a general optimization of the asynchronous integrated circuit, but only local optimizations which may not be the most adapted. Further, the real operating characteristics of the rendez-vous protocol elements which are not considered are not taken into account by the optimization algorithms.

To design an asynchronous circuit by using synchronous circuit design assistance tools, the present invention comprises using a specific model of rendez-vous protocol element which is used by the synchronous circuit design assistance tools.

For each cell of a library used for the design of synchronous or asynchronous circuits, paths internal to the cell are defined, and for each internal path, parameters which characterize the signal propagation on this internal path are defined. An internal path is a signal propagation path between an input terminal of the cell receiving a signal in operation and an output terminal of the cell delivering a signal in operation.

Figure 21:
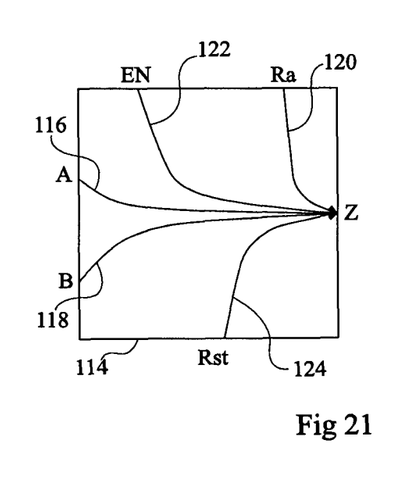
FIG. 21 shows an example of a known library cell representing an asynchronous rendez-vous protocol element.

FIG. 21 schematically shows a conventional cell 114 of a rendez-vous protocol element library, comprising as an example two input terminals A and B, a terminal Rst of reception of reset signal Reset, a terminal Ra of reception of acknowledgement signal Rack, a terminal EN of reception of signal Enable, and an output terminal Z. According to the type of pipeline associated with cell 114, terminals EN and/or Rst may be absent. In the present example, cell 114 comprises two input terminals A and B. It should however be clear that cell 114 may comprise a larger number of inputs.

A first internal path 116 connects input terminal A to output terminal Z and is noted A–>Z. A second internal path 118 connects input terminal B to output terminal Z and is noted B–>Z. A third internal path 120 connects terminal Ra to output terminal Z and is noted Ra–>Z. A fourth internal path 122 connects terminal EN to the output terminal and is noted EN–>Z. A fifth internal path 124 connects terminal Rst to output terminal Z and is noted Rst–>Z. When terminals Rst and/or EN are not present, fourth internal path 122 and/or fifth internal path 124 are not present.

For each internal path, the model associated with the cell indicates values for a plurality of signal propagation parameters in different cell operating conditions. Four parameters $D^r$, $D^f$, $T^r$, and $T^f$ are generally defined for each internal path:

parameter $D^r$ is equal to the delay which elapses so that the signal at the output of the internal path switches from "0" to "1" when the signal at the input of the internal path switches from "0" to "1";

parameter $D^f$ is equal to the delay which elapses so that the signal at the output of the internal path switches from "1" to "0" when the signal at the input of the internal path switches from "1" to "0";

parameter $T^r$ is equal to the ratio of the time taken by the signal at the output of the internal path to switch from "0" to "1" to the time taken by the signal at the output of the internal path to switch from "0" to "1" when the signal at the input of the internal path switches from "0" to "1" and the signal at the output of the internal path switches from "0" to "1"; and parameter $T^f$ is equal to the ratio of the time taken by the signal at the output of the internal path to switch from "1" to "0" to the time taken by the signal at the output of the internal path to switch from "1" to "0" when the signal at the input of the internal path switches from "1" to "0" and the signal at the output of the internal path switches from "1" to "0".

Parameters $D^r$, $D^f$, $T^r$, and $T^f$ are provided as an example. Other parameters may be used in addition to parameters $D^r$, $D^f$, $T^r$, and $T^f$ or instead of parameters $D^r$, $D^f$, $T^r$, and $T^f$.

For each of these parameters, the model of cell 114 comprises an array which contains a number P*Q of values of the parameter determined for a number P of transition times $\Delta_i$ of the signal at the input terminal of the internal path and a number Q of capacitances $Cap_j$ of a load connected to the output terminal of the internal path, i being an integer varying from 1 to P and j being an integer varying from 1 to Q. As an example, call $D_{i,j}^{r(A \to Z)}$ the element of the array of parameter $D^r$ for path A–>Z at indexes i and j. The arrays may be determined by simulations or tests.

An embodiment of the present invention comprises, for at least certain rendez-vous protocol elements of the asynchronous circuit to be synthesized, modifying the cells of the library associated with such rendez-vous protocol elements by using a new model of internal signal propagation parameters so that the rendez-vous protocol elements are considered, by the design assistance tools, as elements rated by a clock signal.

Figure 22:
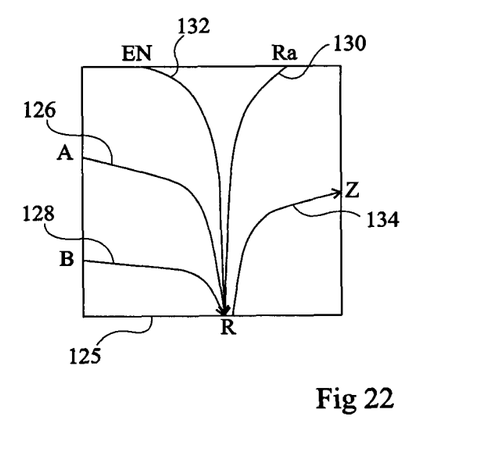
FIG. 22 shows an example of a library cell according to the invention representing the asynchronous rendez-vous protocol element of FIG. 21.

FIG. 22 schematically shows a library cell 125 according to the invention which is used instead of cell 114. The present invention provides creating a terminal R and replacing paths A–>Z, B–>Z, Ra–>Z, and EN–>Z (respectively paths 116, 118, 120, and 122 in FIG. 21) with paths A–>R, B–>R, Ra–>R, EN–>R, and R–>Z in the model of cell 125 (respectively paths 126, 128, 130, 132, and 134 in FIG. 22).

Terminal R may be a terminal which does not exist on cell 114. Such is the case, for example, when cell 114 comprises no terminal Rst. As a variation, when cell 114 receives a reset signal on terminal Rst, terminal R may correspond to terminal Rst. Path Rst–>Z 124 is then replaced with path R–>Z 134.

Terminal R is indicated in the cell model as a terminal intended to receive a clock signal. Paths between the rendez-vous protocol elements thus defined can then be automatically determined by the design assistance tool since the tool considers that the rendez-vous protocol elements are elements rated by a clock signal.

For path R–>Z, parameters $\hat{D}^{r(R \to Z)}$, $\hat{D}^{f(R \to Z)}$, $\hat{T}^{r(R \to Z)}$ and $\hat{T}^{f(R \to Z)}$ which are defined like previously-described parameters $D^r$, $D^f$, $T^r$, $T^f$, are used. Parameters $\hat{D}^{r(R \to Z)}$, $\hat{D}^{f(R \to Z)}$, $\hat{T}^{r(R \to Z)}$, and $\hat{T}^{f(R \to Z)}$ depend on the capacitance of the load connected to the output terminal of the internal path.

For internal paths A–>R, B–>R, Ra–>R, and possibly EN–>R, a parameter $\hat{S}^r$ which corresponds to the delay which elapses so that a dummy clock signal at the output of the internal path switches from "0" to "1" when the signal at the input of the internal path switches from "0" to "1" is defined. A parameter $\hat{S}^f$ which corresponds to the delay which elapses so that the dummy clock signal at the output of the internal path switches from "1" to "0" when the signal at the input of the internal path switches from "1" to "0" is also defined. Parameters $\hat{S}^r$ and $\hat{S}^f$ depend on the transition time of the signal at the input of the internal path.

Figure 23:
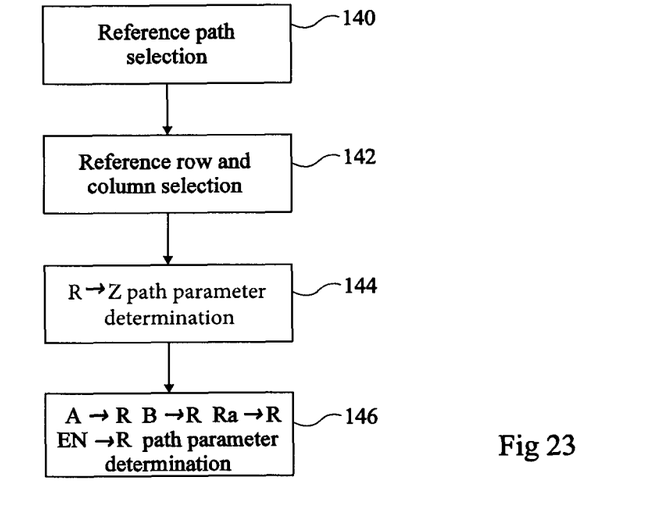
FIG. 23 shows, in the form of a block diagram, an embodiment of a cell design method according to the invention.

FIG. 23 shows, in the form of a block diagram, an embodiment of the method of determining parameter arrays, associated with cell 125, $\hat{S}^{r(A \to R)}$, $\hat{S}^{f(A \to R)}$, $\hat{S}^{r(B \to R)}$, $\hat{S}^{f(B \to R)}$, $\hat{S}^{r(Ra \to R)}$, $\hat{S}^{f(Ra \to R)}$, $\hat{S}^{r(EN \to R)}$, $\hat{S}^{f(EN \to R)}$, $\hat{D}^{r(R \to Z)}$, $\hat{D}^{f(R \to Z)}$, $\hat{T}^{r(R \to Z)}$ and $\hat{T}^{f(R \to Z)}$.

At step 140, one of paths A–>Z, B–>Z, Ra–>Z, or EN–>Z of cell 114 is selected. As an example, in the following description, internal path A–>Z is selected. When terminal EN is present, which is particularly true for the cells of functional blocks 28 of the PCFB and PCHB pipelines, internal path EN–>Z may advantageously be selected.

At step 142, a time $\Delta_I$ of transition of the signal at the input of the internal path is selected from among the P times and a capacitance $Cap_J$ is selected from among the Q capacitances. This amounts to selecting row I and column J in the arrays of parameters associated with cell 114. The selection of time $\Delta_I$ and of capacitance $Cap_J$ may be arbitrary or may depend on the provided use of the rendez-vous protocol element.

At step 144, for path R–>Z, the parameters are determined according to the following relations, for j varying from 1 to Q:

$$\hat{D}_j^{r(R \to Z)} = D_{I,j}^{r(A \to Z)}$$

$$\hat{D}_j^{f(R \to Z)} = D_{I,j}^{f(A \to Z)}$$

$$\hat{T}_j^{r(R \to Z)} = T_{I,j}^{r(A \to Z)}$$

$$\hat{T}_j^{f(R \to Z)} = T_{I,j}^{f(A \to Z)}$$

In the case where terminal R corresponds to terminal Rst, parameters which are normally associated with path Rst–>Z are thus not taken into account in the model of cell 114.

At step 146, for each path A–>R, B–>R, Ra–>R, and possibly EN–>R, parameters $\hat{S}^f$ and $\hat{S}^r$ are determined according to the following relations, for i varying from 1 to P:

$$\hat{S}_i^{r(B \to R)} = D_{i,J}^{r(B \to Z)} - \hat{D}_J^{r(R \to Z)}$$

$$\hat{S}_i^{f(B \to R)} = D_{i,J}^{f(B \to Z)} - \hat{D}_J^{f(R \to Z)}$$

$$\hat{S}_i^{r(Ra \to R)} = D_{i,J}^{r(Ra \to Z)} - \hat{D}_J^{r(R \to Z)}$$

$$\hat{S}_i^{f(Ra \to R)} = D_{i,J}^{f(Ra \to Z)} - \hat{D}_J^{f(R \to Z)}$$

$$\hat{S}_i^{r(EN \to R)} = D_{i,J}^{r(EN \to Z)} - \hat{D}_J^{r(R \to Z)}$$

$$\hat{S}_i^{f(EN \to R)} = D_{i,J}^{f(EN \to Z)} - \hat{D}_J^{f(R \to Z)}$$

$$\hat{S}_i^{r(A \to R)} = D_{i,J}^{r(A \to Z)} - \hat{D}_J^{r(A \to Z)}$$

$$\hat{S}_i^{f(A \to R)} = D_{i,J}^{f(A \to Z)} - \hat{D}_J^{f(A \to Z)}$$

Figure 24:
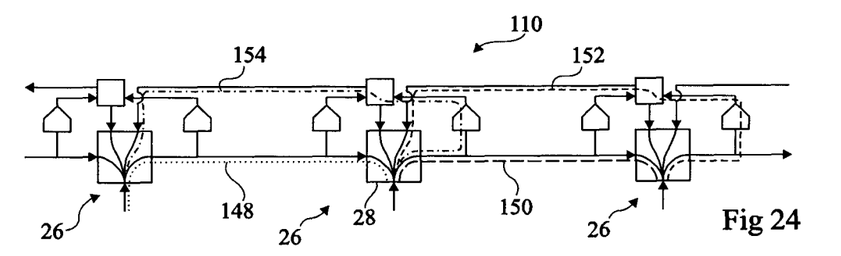
FIG. 24 schematically shows paths traveled by signals in the pipeline of FIG. 20 involving the cells shown in FIG. 22.

FIG. 24 illustrates examples of paths 148, 150, 152, 154 which may be used on implementation of an optimization algorithm of a synchronous integrated circuit design assistance tool to replace path 112 of FIG. 20. Paths 148, 150, 152, and 154 may be automatically defined by a synchronous integrated circuit design assistance tool which considers for each rendez-vous protocol element, in this example, functional block 28 of each stage 26, internal paths A–>R, B–>R, Ra–>R and EN–>R and R–>Z such as previously defined and considers that the rendez-vous protocol element is rated by a dummy clock signal which would be received by terminal R.

Figure 25:
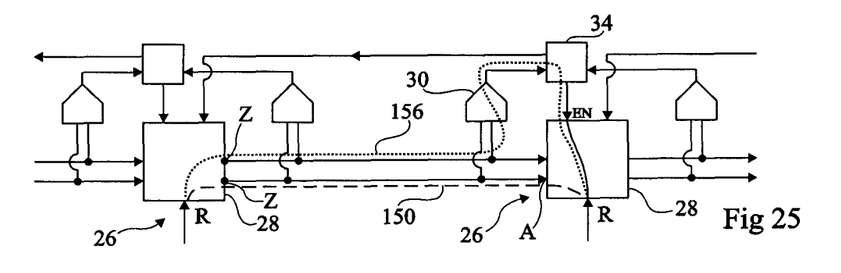
FIG. 25 schematically shows other paths traveled by signals in the pipeline of FIG. 20 to illustrate a variation of the cell design method according to the invention.

FIG. 25 shows two stages of pipeline 110 of FIG. 24. Two specific paths 150 and 156 are shown. Path 156 starts at terminal R of a cell of functional block 28 of a stage 26 and then successively runs through terminal Z of the cell of functional block 28 of stage 26, through upstream detection block 30 of the next stage 26, through synchronization block 34 of the next stage 26, through terminal EN of a cell of functional block 28 of the next stage 26, and ends at terminal R of the cell of functional block 28 of the next stage 26. Path 150 starts at terminal R of another cell of functional block 28 of stage 26 and then successively runs through terminal Z of the cell of functional block 28 of stage 26, through terminal A of a cell of functional block 28 of the next stage 26, and ends at terminal R of the cell of functional block 28 of the next stage 26. Path 156 is present when terminal EN is present. This is particularly true for the previously-described PCHB and PCFB pipelines.

Paths 150 and 156 form an isochronous fork. Given the operation of the pipelines, the signal following path 150 should reach terminal A before the signal following path 156 reaches terminal EN.

According to an alternative embodiment, to decreases risks for the signal taking path 156 to reach terminal EN before the signal taking path 150 reaches terminal A, parameters $\hat{S}^f$ and $\hat{S}^r$ for paths A–>R and B–>R of cell 125 are determined according to the previously-described relations by however adding a positive security margin, the determination of the other paths EN–>R and Ra–>R being unmodified.

As an example, considering that path EN–>R is the reference path, the expression of parameters $\hat{S}^r$ for path B–>R is the following:

$$\hat{S}_i^{r(B \to R)} = D_{i,J}^{r(B \to Z)} - \hat{D}_J^{r(R \to Z)} + \text{Margin}$$

where Margin corresponds to the security margin and is a real number greater than or equal to zero. Security Margin may be a positive constant equal for paths A–>R and B–>R of all the cells of functional blocks 28 of the pipeline. The security margin may be a positive value which depends on the considered cell. As an example, the security margin may depend on time Δ taken by the transition from the low level to the high level or from the high level to the low level of the clock signal declared on terminal R, which is not otherwise used in the calculation of the other parameters.

For all the cells 125 for which terminal R does not correspond to terminal Rst, time Δ may correspond to the time for the same type of transition (from the low level to the high level or from the high level to the low level) for all these cells. For all the cells 125 for which terminal R corresponds to terminal Rst, which, in operation, receives reset signal Reset, the resetting may be performed for certain cells when reset signal Reset switches from the high level to the low level (first transition type) and may be performed for other cells when reset signal Reset switches from the low level to the high level (second transition type). In this case, for cells which, in operation, are reset by the first transition type of reset signal Reset, time Δ may correspond to the time taken for a same type of transition of the clock signal (which may be of the first type or of the second type of transition). For cell which, in operation, are reset by the second transition type of reset signal Reset, time Δ may correspond to the time taken by the opposite type of transition of the clock signal.

Figure 26:
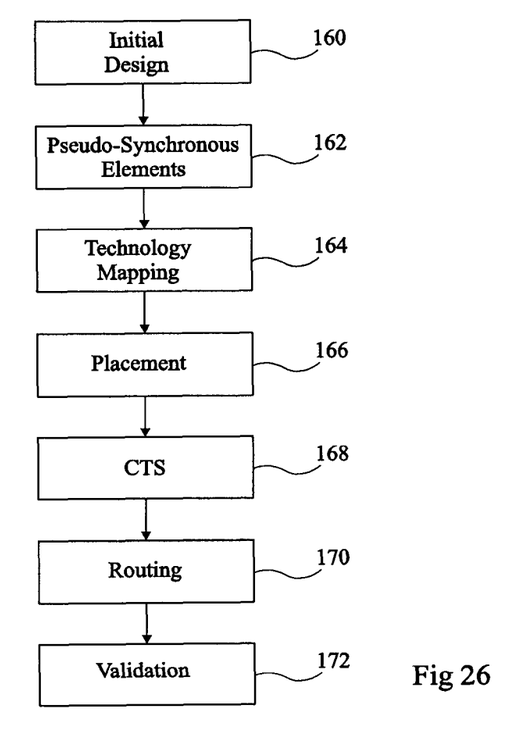
FIG. 26 shows, in the form of a block diagram, an embodiment of a method of designing an asynchronous circuit according to the invention.

FIG. 26 shows, in the form of a block diagram, an embodiment of a method of designing an asynchronous integrated circuit which uses a synchronous integrated circuit design assistance tool. The synchronous integrated circuit design assistance tool may be formed in hardware fashion, that is, by a dedicated electronic circuit. As a variation, the synchronous integrated circuit design assistance tool may be implemented by computer means, that is, at least partly by the execution by a calculator of instructions of a computer program, for example stored in a memory.

When the method is partially or totally implemented in software form, the corresponding instruction sequence may be stored in removable storage means (such as for example, a floppy disk, a CD-ROM, or a DVD-ROM) or in a non-removable memory, the storage means being readable by a computer or a microprocessor.

At step 160 (Initial Design), the asynchronous circuit is designed in a high-definition language, and then synthesized, to conventionally obtain files of interconnection lists which are independent from the technology used.

At step 162 (Pseudo-Synchronous Elements), cells 125 such as previously defined are selected for certain rendez-vous protocol elements of the circuit to be formed. A dummy clock signal is provided as being received by terminal R of the selected rendez-vous protocol elements. The selection of the rendez-vous protocol elements depends on the pipeline structure. As an example, in the case of an asynchronous pipeline, the rendez-vous protocol elements may comprise cells 29 of functional block 28 of each stage of the pipeline.

When the rendez-vous protocol element comprises a terminal Rst receiving a reset signal, terminal R such as previously defined may correspond to terminal Rst of the rendez-vous protocol element. When the rendez-vous protocol element comprises no terminal receiving a specific reset signal, terminal R then is a dummy terminal which has no physical existence.

The period of the dummy clock signal is set according to the performance desired for the asynchronous circuit. It may for example be set to one quarter of the cycle time targeted for the asynchronous circuit. As a variation, the period of the clock signal may be set to 0 second. Transition time Δ of the clock signal may be set to a value corresponding to the security margin for the isochronous fork between paths 150 and 156. As a variation, the clock signal transition time may take any value, when no security margin is desired to be controlled.

At step 164 (Technology Mapping), a step of technological mapping is carried out by using the library cells, and particularly the cells of the invention.

At step 166 (Placement) and at the following steps 168 and 170, a placing and routing method is implemented. The interconnection list files may be significantly modified. At this step, the design assistance tools distribute the rendez-vous protocol elements and size them according to needs to minimize data and acknowledgement progression time paths. Further, the combinational logic portions may be optimized until the propagation times satisfy the pseudo-synchronous constraints.

At step 168 (Clock Tree Synthesis), a method of designing a dummy clock signal is implemented. In the case where terminal R of the selected rendez-vous protocol elements corresponds to terminal Rst intended to receive in operation a reset signal Reset, the synthesized clock signal corresponds to the network of transmission of reset signal Reset of the rendez-vous protocol elements. Indeed, signal Reset has been considered as a dummy clock signal and until this step, an ideal clock tree with no propagation delay has been considered. The transmission network of reset signal Reset is determined by creating a clock tree with low constraints regarding the time of clock signal propagation from the clock generation circuit all the way to the rendez-vous protocol elements and regarding the delay of the arrival of the clock signal between different rendez-vous protocol elements. When terminal R of the rendez-vous protocol elements has no physical existence, no clock tree is to be synthesized. To achieve this, it is sufficient to indicate that the clock signal is directly generated at the level of terminal R of each rendez-vous protocol element.

At step 170 (Routing), once the clock signal has been designed, the method may carry on the circuit optimization. However, the optimization algorithms implemented after the clock tree design step keep on considering, advantageously, that the reset signal is an ideal clock signal, with no delay.

At step 172 (Validation), all the verification steps are carried out with the real asynchronous models (associated with cells 114) for the rendez-vous protocol elements.

Specific embodiments of the present invention have been described. Various alterations and modifications will occur to those skilled in the art. In particular, embodiments of linear asynchronous pipelines have been described. However, the present invention may also be implemented for the design of non-linear asynchronous pipelines. Further, in FIG. 19, a cell of a functional block 28 carrying out an OR logic function has been described. It should however be clear that the cell may carry out another logic function, for example, an AND, NAND, NOR, etc. function or any other combinational logic function. Further, the present invention has been described for the design of an asynchronous integrated circuit. It may of course be implemented for the design of an integrated circuit comprising synchronous circuit portions and asynchronous circuit portions.

Various embodiments with different variations have been described hereabove. It should be noted that those skilled in the art may combine various elements of these various embodiments and variations without showing any inventive step.

The invention claimed is:

1. A method comprising steps of:
providing, in a synchronous integrated circuit design assistance tool implemented by a computer, a library of cells comprising at least one cell having parameters of signal propagation between a first terminal (A) and a second terminal (R) and between the second terminal (R) and a third terminal (Z) depending on the parameter of signal propagation between the first and the third terminal;
synthesizing, in the synchronous integrated circuit design assistance tool implemented by a computer, a synchronous integrated circuit corresponding to the asynchronous integrated circuit by using said cell to represent a portion of the asynchronous circuit, and wherein said cell is rated by a dummy clock signal supplied to the second terminal; and
verifying, in the synchronous integrated circuit design assistance tool implemented by a computer, the synthesized integrated circuit by using the parameter of signal propagation between the first terminal and the third terminal to simulate the operation of said portion of the asynchronous circuit.

2. The method of claim 1, wherein the library comprises, for said cell, an indication that the second terminal (R) is intended to receive the dummy clock signal during the design of the asynchronous integrated circuit by a synchronous integrated circuit design assistance tool.

3. The method of claim 1, wherein the cell is representative of a portion of the asynchronous circuit, the second terminal (R) being intended, in operation, to receive a signal (Reset) for resetting the circuit portion.

4. The method of claim 1, wherein the cell is representative of a portion of the asynchronous circuit, where the second terminal (R) does not correspond to a physical terminal of the portion intended, in operation, to deliver or to receive signals.

5. The method of claim 1, wherein the cell comprises a first parameter of signal propagation from the first terminal (A) to the second terminal (R) and a second parameter of signal propagation from the second terminal (R) to the third terminal (Z), the first and second parameters being obtained from a third parameter of signal propagation from the first terminal to the third terminal, wherein the third parameter corresponds to an array of elements $D_{i,j}^{r(A \to Z)}$ where i is an integer varying from 1 to P and j is an integer varying from 1 to Q, wherein the second parameter corresponds to an array of elements $\hat{D}_j^{r(R \to Z)}$ obtained according to the following relation:

$$\hat{D}_j^{r(R \to Z)} = D_{I,j}^{r(A \to Z)}$$

I being a natural integer selected between 1 and P, and wherein the first parameter corresponds to an array of elements $\hat{S}_i^{r(A \to R)}$ obtained according to the following relation:

$$\hat{S}_i^{r(A \to R)} = D_{i,J}^{r(A \to Z)} - \hat{D}_J^{r(A \to Z)}$$

J being a natural integer selected between 1 and Q.

6. The method of claim 2, wherein the cell further comprises a fourth terminal (B), a fourth parameter of signal propagation from the fourth terminal to the third terminal (Z) corresponding to an array of elements $D_{i,j}^{r(B \to Z)}$, the library further comprising a fifth parameter of signal propagation from the fourth terminal to the second terminal (R), the fifth parameter corresponding to an array of elements $\hat{S}_i^{r(B \to R)}$ obtained according to the following relation:

$$\hat{S}_i^{r(B \to R)} = D_{i,J}^{r(B \to Z)} - \hat{D}_J^{r(R \to Z)} + \text{Margin}$$

where Margin is a real number greater than or equal to zero, which is constant independently from i or which depends on the transition time of the dummy clock signal on the second terminal.

7. The method of claim 5, wherein the first terminal (A) is, in operation, a terminal of reception of a first signal alternating between two states, wherein the third terminal (Z) is, in operation, a terminal of provision of a second signal alternating between two states and wherein the third parameter corresponds to the time between a state switching of the first signal and a state switching of the second signal.

8. The method of claim 1, wherein the second terminal (R) corresponds to the terminal of the portion of the asynchronous circuit intended, in operation, to receive a signal (Reset) for resetting said portion of the asynchronous circuit, the method comprising a step of designing a clock tree to transmit the dummy clock signal to said portion of the asynchronous circuit, the clock tree being used in operation as a network for the distribution of the reset signal to said portion of the asynchronous circuit.

9. The method of claim 1, wherein the verification step is carried out with an asynchronous model to simulate the operation of said portion of the asynchronous circuit.

10. Non-transitory computer-readable storage means storing a computer program comprising a set of instructions executable by a computer to implement the method of claim 1.

11. Non-transitory computer-readable storage means storing a cell library to implement the method of claim 1.

* * * * *